US010570477B2

United States Patent
Ota et al.

(10) Patent No.: US 10,570,477 B2
(45) Date of Patent: Feb. 25, 2020

(54) HIGH-STRENGTH STEEL, METHOD FOR MANUFACTURING HIGH-STRENGTH STEEL, STEEL PIPE, AND METHOD FOR MANUFACTURING STEEL PIPE

(71) Applicant: JFE STEEL CORPORATION, Tokyo (JP)

(72) Inventors: Shusaku Ota, Tokyo (JP); Junji Shimamura, Fukuyama (JP); Nobuyuki Ishikawa, Kawasaki (JP); Shigeru Endo, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 126 days.

(21) Appl. No.: 15/561,236

(22) PCT Filed: Mar. 25, 2016

(86) PCT No.: PCT/JP2016/001726
§ 371 (c)(1),
(2) Date: Sep. 25, 2017

(87) PCT Pub. No.: WO2016/157856
PCT Pub. Date: Oct. 6, 2016

(65) Prior Publication Data
US 2018/0051355 A1    Feb. 22, 2018

(30) Foreign Application Priority Data

Mar. 27, 2015   (JP) ................. 2015-065775

(51) Int. Cl.
| | |
|---|---|
| *C21D 9/46* | (2006.01) |
| *C22C 38/58* | (2006.01) |
| *C21D 6/00* | (2006.01) |
| *C21D 8/02* | (2006.01) |
| *C22C 38/00* | (2006.01) |
| *C22C 38/02* | (2006.01) |
(Continued)

(52) U.S. Cl.
CPC .............. *C21D 9/46* (2013.01); *B23K 9/0282* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0263* (2013.01); *C21D 8/10* (2013.01); *C21D 9/08* (2013.01); *C22C 38/00* (2013.01); *C22C 38/001* (2013.01); *C22C 38/002* (2013.01); *C22C 38/02* (2013.01); *C22C 38/06* (2013.01); *C22C 38/12* (2013.01); *C22C 38/14* (2013.01); *C22C 38/18* (2013.01); *C22C 38/24* (2013.01); *C22C 38/26* (2013.01); *C22C 38/28* (2013.01); *C22C 38/34* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *F16L 9/17* (2013.01); *C21D 2211/002* (2013.01)

(58) Field of Classification Search
CPC .......... C21D 9/46; C21D 6/004; C21D 6/005; C21D 6/008; C21D 8/0205; C21D 8/0226; C21D 8/0263; C21D 8/10; C21D 9/08; C21D 2211/002; B23K 9/0282; C22C 38/00; C22C 38/001; C22C 38/002; C22C 38/02; C22C 38/06; C22C 38/12; C22C 38/14; C22C 38/18; C22C 38/24; C22C 38/26; C22C 38/28; C22C 38/34; C22C 38/38; C22C 38/42; C22C 38/44; C22C 38/46; C22C 38/48; C22C 38/50; C22C 38/58; F16L 9/17
See application file for complete search history.

(56) References Cited

U.S. PATENT DOCUMENTS

| | | |
|---|---|---|
| 9,540,717 B2 | 1/2017 | Nakata et al. |
| 2012/0305122 A1 | 12/2012 | Ishikawa et al. |

(Continued)

FOREIGN PATENT DOCUMENTS

| | | |
|---|---|---|
| CA | 2810167 A1 | 3/2012 |
| CA | 2867798 A1 | 10/2013 |

(Continued)

OTHER PUBLICATIONS

Extended European Search Report for European Application No. 16771744.6, dated Nov. 24, 2017, 8 pages.

(Continued)

*Primary Examiner* — Anthony J Zimmer
*Assistant Examiner* — Ricardo D Morales
(74) *Attorney, Agent, or Firm* — RatnerPrestia

(57) ABSTRACT

High-strength steel having a specified chemical composition, wherein X (%) calculated by using equation (1):

$$X = 0.35Cr + 0.9Mo + 12.5Nb + 8V \quad (1)$$

is 0.75% or more, wherein the symbols of chemical elements in equation (1) respectively denote the contents (mass %) of the corresponding chemical elements and wherein the symbol of a chemical element which is not included is assigned a value of 0, a microstructure having a bainite phase fraction of 50% or more, a dislocation density of $1.0 \times 10^{15}/\text{m}^2$ or more after aging has been performed under the condition of a Larson-Miller parameter (LMP) of 15000, and a yield strength of 550 MPa or more before and after the aging is performed, as well as methods of manufacturing such high-strength steel, is disclosed. The high-strength steel can be used as a raw material for manufacturing large diameter steel pipe having the strength properties required for its use in steam transportation.

9 Claims, No Drawings

(51) Int. Cl.

| | | |
|---|---|---|
| *C22C 38/38* | (2006.01) | |
| *C22C 38/26* | (2006.01) | |
| *C22C 38/14* | (2006.01) | |
| *C22C 38/12* | (2006.01) | |
| *C22C 38/34* | (2006.01) | |
| *C21D 8/10* | (2006.01) | |
| *C22C 38/28* | (2006.01) | |
| *C22C 38/18* | (2006.01) | |
| *C22C 38/24* | (2006.01) | |
| *B23K 9/028* | (2006.01) | |
| *C21D 9/08* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *F16L 9/17* | (2006.01) | |

(56) References Cited

U.S. PATENT DOCUMENTS

| | | |
|---|---|---|
| 2013/0004787 A1 | 1/2013 | Ishiyana et al. |
| 2018/0051363 A1 | 2/2018 | Shimamura et al. |
| 2018/0057905 A1 | 3/2018 | Ota et al. |
| 2018/0057906 A1 | 3/2018 | Ota et al. |
| 2018/0066332 A1 | 3/2018 | Ota et al. |
| 2018/0073095 A1 | 3/2018 | Ota et al. |
| 2018/0105907 A1 | 4/2018 | Ota et al. |

FOREIGN PATENT DOCUMENTS

| | | |
|---|---|---|
| CA | 2868593 A1 | 10/2013 |
| CA | 2914441 A1 | 12/2014 |
| CA | 2980247 A1 | 9/2016 |
| CA | 2980250 A1 | 9/2016 |
| CA | 2980252 A1 | 9/2016 |
| CA | 2980424 A1 | 9/2016 |
| CA | 2980983 A1 | 10/2016 |
| CA | 2980985 A1 | 10/2016 |
| CN | 102639734 A | 8/2012 |
| CN | 102666899 A | 9/2012 |
| CN | 103649351 A | 3/2014 |
| CN | 104011245 A | 8/2014 |
| CN | 104220623 A | 12/2014 |
| CN | 104411853 A | 3/2015 |
| CN | 104428437 A | 3/2015 |
| EP | 2505681 A1 | 10/2012 |
| EP | 2505683 A1 | 10/2012 |
| EP | 2799575 A1 | 11/2014 |
| EP | 2832890 A1 | 2/2015 |
| EP | 2868765 A1 | 5/2015 |
| EP | 2871252 A1 | 5/2015 |
| EP | 2980249 A1 | 2/2016 |
| JP | 2006183133 A | 7/2006 |
| JP | 2007119884 A * | 5/2007 |
| JP | 2007119884 A | 5/2007 |
| JP | 2007169747 A | 7/2007 |
| JP | 2048195991 A | 8/2008 |
| JP | 2011132601 A | 7/2011 |
| JP | 4741528 B2 | 8/2011 |
| JP | 4821939 B2 | 11/2011 |
| JP | 4904806 B2 | 3/2012 |
| JP | 5055736 B2 | 10/2012 |
| JP | 2013112872 A | 6/2013 |
| JP | 2013173998 A | 9/2013 |
| WO | 2012108027 A1 | 7/2014 |
| WO | 2014156175 A1 | 10/2014 |

OTHER PUBLICATIONS

International Search Report and Written Opinion for International Application No. PCT/JP2016/001726, dated Jun. 14, 2016—5 Pages 2017.

Chinese Office Action for Chinese Application No. 201680018152.1, dated Mar. 18, 2019 with Concise Statement of Relevance of Office Action, 9 pages.

Korean Office Action for Korean Application No. 10-2017-7025780, dated Oct. 17, 2018 with Concise Statement of Relevance, 5 pages.

Chinese Office Action for Chinese Application No. 201680018152.1, dated Aug. 27, 2018, with Concise Statement of Search Report, 10 pages.

Canadian Office Action for Canadian Application No. 2,976,745, dated Aug. 23, 2018, 5 pages.

Korean Notice of Allowance for Korean Application No. 10-2017-7025780, dated May 14, 2019 with translation 2 pages.

Canadian Office Action for Canadian Application No. 2,976,745, dated Jul. 31, 2019, 3 pages.

* cited by examiner

HIGH-STRENGTH STEEL, METHOD FOR MANUFACTURING HIGH-STRENGTH STEEL, STEEL PIPE, AND METHOD FOR MANUFACTURING STEEL PIPE

CROSS REFERENCE TO RELATED APPLICATIONS

This is the U.S. National Phase application of PCT/JP2016/001726, filed Mar. 25, 2016, which claims priority to Japanese Patent Application No. 2015-065775, filed Mar. 27, 2015, the disclosures of these applications being incorporated herein by reference in their entireties for all purposes.

TECHNICAL FIELD OF THE INVENTION

The present invention relates to high-strength steel having a yield strength of 550 MPa or more before and after being subjected to long-term aging in a mid-temperature range. In particular, the high-strength steel according to the present invention can be used as a raw material for a high-strength steel pipe for a steam line.

BACKGROUND OF THE INVENTION

Examples of a method for recovering oil sand from an underground oil layer in, for example, Canada include an open-pit mining method and a steam injection method, in which high-temperature high-pressure steam is charged into an oil layer through steel pipes. Since there are only a small number of regions in which the open-pit mining can be used, the steam injection method is used in many areas.

The temperature of steam which is charged into an oil layer in the steam injection method is in a temperature range of 300° C. to 400° C. (hereinafter, referred to as "a mid-temperature range"). In the steam injection method, steam having a temperature in the mid-temperature range is charged into an oil layer under high pressure. In order to charge steam, steel pipes are used as described above.

Nowadays, in order to increase the recovery rate of heavy oil and in order to decrease laying costs in response to an increase in demand for energy, there is a demand for an increase in the diameter and strength of the steel pipe described above.

Examples of a conventional technique regarding a steel pipe for steam transportation which can be used for a steam injection method are described in Patent Literature 1 and Patent Literature 2. In Patent Literature 1 and Patent Literature 2, seamless steel pipes having a strength equivalent to API grade X80 are described, and the maximum outer diameter of such seamless steel pipes is 16 inches.

It is more difficult to increase the diameter of a seamless steel pipe than other kinds of steel pipes. In addition, in the case of a seamless steel pipe, it is necessary that large amounts of alloy chemical elements be added in order to achieve a strength of API grade X80 or higher.

Here, Patent Literature 3 and Patent Literature 4 describe techniques for manufacturing a welded high-strength steel pipe with which it is possible to increase the diameter of a steel pipe. More specifically, Patent Literature 3 and Patent Literature 4 relate to techniques for manufacturing a high-strength steel pipe having a strength of API grade X80 or higher which is manufactured by using a TMCP (thermo-mechanical control process).

PATENT LITERATURE

PTL 1: Japanese Unexamined Patent Application Publication No. 2000-290728
PTL 2: Japanese Patent No. 4821939
PTL 3: Japanese Patent No. 5055736
PTL 4: Japanese Patent No. 4741528

SUMMARY OF THE INVENTION

In the case of Patent Literature 3, the requirements of high-temperature properties in the mid-temperature range for grade X80 are satisfied. However, no consideration is given to strength properties when a pipe is used for a long time in Patent Literature 3.

In the case of Patent Literature 4, since creep properties after the developed steel has been subjected to long-term aging are described, there is an increase in rupture strength. However, criteria for judging safety are not clearly described. In addition, since the values of rupture strength are less than 80% (=440 MPa) of the lower standard limit of yield stress for grade X80 in some cases, it is far from sufficient strength.

As described above, in the case of the conventional techniques, it is not possible to obtain a high-strength steel pipe for a steam line which satisfies all the conditions that the steel pipe has a large diameter and the strength properties required for a high-strength steel pipe for steam transportation.

An object of the present invention is to provide high-strength steel which can be used as a raw material for a steel pipe which satisfies all the conditions that the steel pipe has a large diameter and the strength properties which are required for a high-strength steel pipe for steam transportation and a method for manufacturing the steel. Also, an object of the present invention is to provide a steel pipe which is composed of the high-strength steel described above and a method for manufacturing the steel pipe.

It has been determined that, by appropriately selecting a chemical composition and manufacturing conditions, it is possible to obtain high-strength steel from which it is possible to manufacture a high-strength steel pipe having strength properties required for a high-strength steel pipe for steam transportation despite having a large diameter.

Embodiments of the present invention include:

[1] High-strength steel having a chemical composition containing, by mass %, C: 0.04% to 0.09%, Si: 0.05% to 0.20%, Mn: 1.5% to 2.0%, P: 0.020% or less, S: 0.002% or less, Cr: 0.50% or less, Mo: 0.10% to 0.50%, Nb: 0.010% to 0.050%, V: 0.070% or less, Ti: 0.005% to 0.02%, Al: 0.01% to 0.04%, N: 0.006% or less, and the balance being Fe and inevitable impurities, in which X (%) calculated by using equation (1) is 0.75% or more, a microstructure having a bainite phase fraction of 50% or more, a dislocation density of $1.0 \times 10^{15}/m^2$ or more after aging has been performed under the condition of a Larson-Miller parameter (LMP) of 15000, and a yield strength of 550 MPa or more before and after the aging is performed.

$$X(\%) = 0.35Cr + 0.9Mo + 12.5Nb + 8V \quad (1)$$

The symbols of elements in equation (1) respectively denote the contents (mass %) of the corresponding chemical elements. In addition, the symbol of a chemical element which is not included is assigned a value of 0.

[2] The high-strength steel according to item [1], the high-strength steel having the chemical composition further containing, by mass %, one or both of Cu: 0.50% or less and Ni: 0.50% or less.

[3] A steel pipe composed of the high-strength steel according to item [1] or [2].

[4] A method for manufacturing the high-strength steel according to item [1] or [2], the method including a heating process in which a steel raw material is heated to a temperature of 1100° C. to 1200° C., a hot rolling process in which the steel raw material, which has been heated in the heating process, is hot-rolled under the conditions of an accumulated rolling reduction ratio in a temperature range of 900° C. or lower of 50% or more and a rolling finish temperature of 850° C. or lower, and an accelerated cooling process in which the hot-rolled steel plate, which has been obtained in the hot rolling process, is subjected to accelerated cooling under the conditions of a cooling rate of 5° C./s or more and a cooling stop temperature of 300° C. to 550° C.

[5] A method for manufacturing a steel pipe, the method including a cold forming process in which a steel plate composed of the high-strength steel according to item [1] or [2] is subjected to cold forming so as to be formed into a pipe shape and a welding process in which the butt portions of the steel plate, which has been formed into a pipe shape in the cold forming process, are welded.

According to embodiments of the present invention, it is possible to obtain a high-strength steel pipe having strength properties required for a high-strength steel pipe for steam transportation despite having a large diameter.

DETAILED DESCRIPTION OF THE INVENTION

Hereafter, embodiments of the present invention will be described. Here, the present invention is not limited to the embodiments below.

<High-Strength Steel>

The high-strength steel according to embodiments of the present invention has a chemical composition containing, by mass %, C: 0.04% to 0.09%, Si: 0.05% to 0.20%, Mn: 1.5% to 2.0%, P: 0.020% or less, S: 0.002% or less, Cr: 0.50% or less, Mo: 0.10% to 0.50%, Nb: 0.010% to 0.050%, V: 0.070% or less, Ti: 0.005% to 0.02%, Al: 0.01% to 0.04%, and N: 0.006% or less. In the description below, "%" used when describing the content of the constituent chemical elements means "mass %".

C: 0.04% to 0.09%

C is a chemical element which is necessary for achieving satisfactory strength of steel through solid solution strengthening and precipitation strengthening. In particular, an increase in the amount of solute C and the formation of precipitates contribute to achieving satisfactory strength in the mid-temperature range. In order to achieve the predetermined strength at room temperature and in the mid-temperature range, the C content is set to be 0.04% or more in embodiments of the present invention. In the case where the C content is more than 0.09%, there is a decrease in toughness and weldability. Therefore, the upper limit of the C content is set to be 0.09%. As described above, in embodiments of the present invention, the C content is set to be 0.04% to 0.09%.

Si: 0.05% to 0.20%

Si is added for the purpose of deoxidizing. In the case where the Si content is less than 0.05%, it is not possible to realize a sufficient deoxidizing effect. In the case where the Si content is more than 0.20%, there is a decrease in toughness. Therefore, the Si content is set to be 0.05% to 0.20%.

Mn: 1.5% to 2.0%

Mn is a chemical element which is effective for increasing the strength and toughness of steel. Such effects are not satisfactorily realized in the case where the Mn content is less than 1.5%. In addition, in the case where the Mn content is more than 2.0%, there is a significant decrease in toughness and weldability. Therefore, the Mn content is set to be 1.5% to 2.0%.

P: 0.020% or Less

P is an impurity chemical element and significantly decreases toughness. Therefore, it is preferable that the P content be as small as possible. However, there is an increase in manufacturing costs in the case where the P content is excessively decreased. Therefore, the P content is set to be 0.020% or less so that a decrease in toughness is within an acceptable range.

S: 0.002% or Less

S is an impurity chemical element and decreases toughness. Therefore, it is preferable that the S content be as small as possible. In addition, even if morphological control from MnS to CaS-based inclusions is performed by adding Ca, finely dispersed CaS-based inclusions may cause a decrease in toughness in the case of a high-strength material of grade X80. Therefore, the S content is set to be 0.002% or less.

Cr: 0.50% or Less

Cr is one of the chemical elements which are effective for increasing high-temperature strength by increasing temper softening resistance. In order to realize such an effect, it is preferable that the Cr content be 0.05% or more. However, in the case where the Cr content is more than 0.50%, there is a negative effect on weldability. Therefore, the Cr content is set to be 0.50% or less. Here, in the case where it is possible to increase high-temperature strength by increasing temper softening resistance, for example, by controlling the right-hand side of equation (1) below to be within the desired range, Cr need not be included.

Mo: 0.10% to 0.50%

Mo increases strength through solid solution strengthening and increases quench hardenability. It is possible to realize the effect of increasing strength as a result of solid solution strengthening and an increase in quench hardenability, and, in particular, there is an increase in strength in the mid-temperature range as a result of an increase in temper softening resistance. In the case where the Mo content is less than 0.10%, it is not possible to achieve sufficient strength because such an effect is small. On the other hand, in the case where the Mo content is more than 0.50%, such an effect becomes saturated, and there is a decrease in toughness and weldability. Therefore, the Mo content is set to be 0.10% to 0.50%.

Nb: 0.010% to 0.050%

Nb inhibits the growth of crystal grains when a slab is heated and rolled. As a result of such inhibition, since a fine microstructure is formed, it is possible to provide sufficient strength and toughness to steel. In addition, Nb is a chemical element which is necessary for achieving satisfactory strength in the mid-temperature range by forming carbides. Such effects are significant in the case where the Nb content is 0.010% or more. In addition, in the case where the Nb content is more than 0.050%, such effects become almost saturated, and there is a decrease in toughness and weldability. Therefore, the Nb content is set to be 0.010% to 0.050%.

V: 0.070% or Less

Adding a small amount of V contributes to an increase in strength by decreasing crystal grain size. In addition, V is one of the chemical elements which are effective for increasing strength in the mid-temperature range by increasing temper softening resistance. In order to realize such effects, it is preferable that the V content be 0.01% or more. In addition, in the case where the V content is more than 0.070%, there is a decrease in the toughness of a weld heat-affected zone. Therefore, the V content is set to be 0.070% or less. Here, in the case where it is possible to increase high-temperature strength, for example, as a result of X, which is calculated by using equation (1) below, being within the desired range, V need not be included.

Ti: 0.005% to 0.02%

Ti is effective for increasing toughness due to the formation of fine microstructure as a result of inhibiting the grain growth when a slab is heated or in a weld heat-affected zone by forming TiN. In order to realize such an effect, it is necessary that the Ti content be 0.005% or more. In addition, in the case where the Ti content is more than 0.02%, there is a decrease in toughness. Therefore, the Ti content is set to be 0.02% or less.

Al: 0.01% to 0.04%

Al is added as a deoxidizing agent. In order to realize such an effect, it is necessary that the Al content be 0.01% or more. In the case where the Al content is more than 0.04%, there is a decrease in toughness. Therefore, the Al content is set to be 0.01% to 0.04%.

N: 0.006% or Less

N combines with Ti to form TiN. TiN is finely dispersed in a weld heat-affected zone which is heated to a high temperature of 1350° C. or higher. Such fine dispersion significantly contributes to an increase in the toughness of a weld heat-affected zone as a result of decreasing the grain size of prior austenite in a weld heat-affected zone. In order to realize such an effect, it is preferable that the N content be 0.002% or more. In the case where the N content is more than 0.006%, there is a decrease in the toughness of a base metal and a weld metal in the steel pipe state due to coarsening of the grains of precipitates and an increase in the amount of solute N. Therefore, the N content is set to be 0.006% or less.

$$X(X=0.35Cr+0.9Mo+12.5Nb+8V) \quad (1):$$

0.75% or More

In addition, in embodiments of the present invention, the Cr content, the Mo content, the Nb content, and the V content are controlled so that X (%) is 0.75% or more. X (%) is an important factor for obtaining steel having excellent strength after long-term aging has been performed in the mid-temperature range. It is necessary that X (%) be 0.75% or more in order to control the dislocation density to be $1.0 \times 10^{15}/m^2$ after long-term aging has been performed by inhibiting recovery of dislocation from occurring when long-term aging is performed. In order to manufacture the high-strength steel according to embodiments of the present invention at low cost, it is preferable that X (%) be 1.00% or less, or more preferably 0.90% or less. Here, in embodiments of the present invention, there is a case where Cr or V is not included, and, in such a case, "Cr" or "V" in "0.35Cr+0.9Mo+12.5Nb+8V" may be assigned a value of 0.

In addition, the high-strength steel according to embodiments of the present invention may contain one or both of Cu and Ni in order to further improve properties.

Cu: 0.50% or Less

Cu is one of the chemical elements which are effective for increasing toughness and strength. In order to realize such effects, it is preferable that the Cu content be 0.05% or more. In the case where the Cu content is more than 0.50%, there is a decrease in weldability. Therefore, in the case where Cu is included, the Cu content is set to be 0.50% or less.

Ni: 0.50% or Less

Ni is one of the chemical elements which are effective for improving toughness and increasing strength. In order to realize such effects, it is preferable that the Ni content be 0.05% or more. In the case where the Ni content is more than 0.50%, such effects become saturated, and there is an increase in manufacturing costs. Therefore, in the case where Ni is included, the Ni content is set to be 0.50% or less.

In embodiments of the present invention, it is preferable that the Cu content, the Ni content, the Cr content, and the Mo content be controlled so that Cu+Ni+Cr+Mo (the symbols of elements respectively denote the contents (mass %) of the corresponding chemical elements) is 0.90% or less. The group of these chemical elements contributes to an increase in strength, and the properties of steel are improved in the case where the contents of these chemical elements are increased. However, it is preferable that Cu+Ni+Cr+Mo be 0.90% or less, in order to control manufacturing costs to be low.

The remainder which is different from the constituent chemical elements described above is Fe and inevitable impurities. Examples of the inevitable impurities include B: 0.0002% or less.

Hereafter, the microstructure of the high-strength steel according to embodiments of the present invention will be described. In the microstructure of the high-strength steel according to embodiments of the present invention, the bainite phase fraction is 50% or more in terms of area ratio. It is necessary that the bainite phase fraction be 50% or more in order to increase initial dislocation density. In addition, there is no particular limitation on the upper limit of the bainite phase fraction. Here, among phases other than bainite, for example, ferrite, pearlite, martensite, a martensite-austenite constituent (MA), and retained austenite may be included in an amount of 50% or less in terms of total area ratio.

Hereafter, the strength properties of the high-strength steel according to embodiments of the present invention will be described. After aging has been performed under the condition of a Larson-Miller parameter (LMP) of 15000, the dislocation density is $1.0 \times 10^{15}/m^2$ or more, and the yield strength is 550 MPa or more.

The term "an aging treatment under the condition of an LMP of 15000" means an aging treatment which is performed while the conditions regarding heat treatment temperature and heat treatment time are controlled so that LMP, which is calculated by using equation (2) below, is 15000. "An LMP of 15000" corresponds to a treatment which is performed under the conditions of a heat treatment temperature of 400° C. and a heat treatment time of 8 hours or which is performed at a temperature of 350° C., which is in the mid-temperature range, for one year.

$$LMP=(T+273) \times (20+\log(t)) \quad (2),$$

where T: heat treatment temperature (° C.) and t: heat treatment time (second).

The yield strength after the treatment described above has been performed is 550 MPa or more. As a result of the above-mentioned yield strength being 550 MPa or more, there is an advantage in that it is possible to realize the stable operation of a steel pipe for a steam line. Here, the above-mentioned yield strength means a yield strength which is determined by performing a high-temperature tensile test at a temperature of 350° C.

Here, as described in EXAMPLES, in the case of certain embodiments of the present invention, a test piece taken from any one of a steel plate and a steel pipe has a yield strength of 550 MPa or more before and after the aging treatment described above is performed.

The dislocation density after the treatment described above has been performed is $1.0\times10^{15}/m^2$ or more. As a result of the above-mentioned dislocation density being $1.0\times10^{15}/m^2$ or more, there is an advantage in that it is possible to achieve a yield strength of 550 MPa or more at a temperature of 350° C.

Hereafter, a method for determining dislocation density will be described.

Dislocation density is determined by using a method in which strain is determined through the use of a full-width at half maximum β in X-ray diffractometry and in which the strain is converted into dislocation density. In the case of a diffraction intensity curve which is obtained by using commonly used X-ray diffractometry, since two rays, that is, Kα1 ray and Kα2 ray, which have different wave lengths, overlap with each other, they are separated by using the Rachinger method.

Strain is calculated by using the Williamson-Hall method described below. Since the broadening of a full-width at half maximum depends on the size D of a crystallite and strain ε, it is possible to calculate the broadening of a half-value width by adding both factors as indicated in the equation below.

$$\beta = \beta_1 + \beta_2 = (0.9\lambda/(D\times\cos\theta)) + 2\varepsilon\times\tan\theta$$

Moreover, this equation is transformed into the equation below.

$$\beta\cos\theta/\lambda = 0.9/D + 2\varepsilon\times\sin\theta/\lambda$$

By plotting $\beta\cos\theta/\lambda$ against $\sin\theta/\lambda$, it is possible to calculate strain ε from the slope of the straight line. Here, the diffraction lines which are used for the calculation are (110), (211), and (220). Conversion from strain ε to dislocation density is performed by using the equation below.

$$\rho = 14.4\varepsilon^2/b^2$$

Here, ρ denotes dislocation density and b denotes Burgers Vector (0.25 nm). In addition, θ denotes a peak angle, which is calculated by using the θ-2θ method of X-ray diffractometry, and λ denotes the wavelength of an X-ray which is used for X-ray diffractometry.

<Steel Pipe>

The steel pipe according to embodiments of the present invention is composed of the high-strength steel according to embodiments of the present invention described above. Since the steel pipe according to embodiments of the present invention is composed of the high-strength steel according to embodiments of the present invention, the steel pipe has strength properties which are required for a high-strength welded steel pipe for steam transportation despite having a large diameter.

The term "a large diameter" means a case where a steel pipe has an outer diameter (full diameter) of 500 mm or more. Especially, according to embodiments of the present invention, it is possible to sufficiently increase the above-mentioned outer diameter to 850 mm while maintaining the strength properties which are required for a high-strength welded steel pipe for steam transportation.

In addition, although there is no particular limitation on the thickness of a steel pipe, the thickness is 12 mm to 30 mm in the case of a steel pipe for steam transportation.

As in the case of the high-strength steel described above, the term "strength properties which are required for a high-strength welded steel pipe for steam transportation" means a case where a steel pipe has a dislocation density of $1.0\times10^{15}/m^2$ or more after aging has been performed under the condition of a Larson-Miller parameter (LMP) of 15000 and has a yield strength of 550 MPa or more at a temperature of 350° C. before and after the above-described aging is performed.

<Method for Manufacturing High-Strength Steel>

Hereafter, the method for manufacturing the high-strength steel according to embodiments of the present invention will be described. The manufacturing method according to embodiments of the present invention includes a heating process, a hot rolling process, and an accelerated cooling process. Each process will be described hereafter. Here, in the description below, the term "temperature" means an average temperature in the thickness direction, unless otherwise noted. It is possible to derive the average temperature in the thickness direction through the use of, for example, simulation calculation from, for example, the thickness, the surface temperature, and the cooling conditions. For example, by calculating temperature distribution in the thickness direction through the use of a finite difference method, the average temperature in the thickness direction is derived.

Heating Process

In embodiments of the present invention, the heating process is a process in which a steel raw material is heated to a temperature of 1100° C. to 1200° C. Here, examples of the meaning of the term "a steel raw material" include a slab, which is obtained by casting molten steel. Since the chemical composition of the steel raw material becomes the chemical composition of high-strength steel, the chemical composition of the high-strength steel may be controlled by controlling the chemical composition of the molten steel. Here, there is no particular limitation on the method used for manufacturing the steel raw material. It is preferable that the steel slab be manufactured by using a steel making process which utilizes a converter and a casting process which utilizes a continuous casting method from the viewpoint of economic efficiency.

In order to achieve sufficient strength at room temperature and in the mid-temperature range by sufficiently progressing the formation of austenite and the solid solution of carbides when hot rolling process described below is performed, it is necessary that the heating temperature of the steel be 1100° C. or higher. On the other hand, in the case where the heating temperature is higher than 1200° C., since austenite grains significantly grow, there is a decrease in the toughness of a base metal. Therefore, the heating temperature is set to be 1100° C. to 1200° C.

Hot Rolling Process

In embodiments of the present invention, the hot rolling process is a process in which the steel raw material, which has been heated in the heating process, is subjected to hot rolling under the conditions of an accumulated rolling reduction ratio in a temperature range of 900° C. or lower of 50% or more and a rolling finish temperature of 850° C. or lower.

The upper limit of an austenite non-recrystallization temperature range is increased to a temperature of about 900° C. by adding Nb. By performing rolling in a temperature range of 900° C. or lower, austenite grains are elongated so as to have a small grain size in the thickness and width directions of a steel plate, and there is an increase in the density of dislocations which are introduced in the grains by performing rolling. In the case where the accumulated rolling reduction ratio in a temperature range of 900° C. or lower is controlled to be 50% or more and the rolling finish temperature is controlled to be 850° C. or lower, since such effects are significantly realized, there is an increase in the strength, in particular, the strength in the mid-temperature range of high-strength steel after hot rolling or below-described cooling has been performed and of a steel pipe which is composed of the high-strength steel. Here, although there is no particular limitation on the upper limit of the accumulated rolling reduction ratio described above, excessively large amount of accumulated rolling reduction ratio results in excessive load put on a rolling mill, and thus it is preferable that the accumulated rolling reduction ratio be 90% or less.

In the case where the accumulated rolling reduction ratio in a temperature range of 900° C. or lower is less than 50% or where the rolling finish temperature is higher than 850° C., since there is an insufficient grain refining of austenite grain, and since there is an insufficient increase in the density of dislocations formed in the grains, there is a decrease in strength in the mid-temperature range. Therefore, the accumulated rolling reduction ratio in a temperature range of 900° C. or lower is set to be 50% or more, and the rolling finish temperature is set to be 850° C. or lower.

Here, although there is no particular limitation on the lower limit of the rolling finish temperature described above, it is preferable that the lower limit be equal to or higher than Ar3° C. in order to achieve satisfactory homogeneity of a microstructure by starting cooling from the state in which the whole steel is composed of austenite.

Accelerated Cooling Process

In embodiments of the present invention, the accelerated cooling process is a process in which the hot-rolled steel plate obtained in the hot rolling process is subjected to accelerated cooling under the conditions of a cooling rate (which means an average cooling rate calculated by dividing the difference between the cooling start temperature and the cooling stop temperature by the time required from when cooling is started until cooling is stopped) of 5° C./s or more and a cooling stop temperature of 300° C. to 550° C.

There is a tendency for the strength of high-strength steel to increase with an increase in cooling rate in accelerated cooling. In the case where the cooling rate when accelerated cooling is performed is less than 5° C./s, since the transformation of steel starts at a high temperature, ferrite and pearlite are formed in addition to bainite, and dislocation recovery progresses during cooling. Therefore, in the case where the cooling rate is less than 5° C./s, it is not possible to achieve sufficient strength at room temperature or in the mid-temperature range. Therefore, the cooling rate when accelerated cooling is performed is set to be 5° C./s or more. Here, there is no particular limitation on the upper limit of the cooling rate, it is preferable that the cooling rate be 50° C./s or less in order to prevent an excessive increase in martensite phase fraction.

There is a tendency for the strength of a steel plate to increase with a decrease in cooling stop temperature in accelerated cooling. However, in the case where the cooling stop temperature in accelerated cooling is higher than 550° C., since there is a decrease in the amount of solute carbon due to the growth of carbides being promoted, it is not possible to achieve sufficient strength, in particular, sufficient strength in the mid-temperature range of high-strength steel after below-mentioned cooling has been performed and of a steel pipe which is composed of the high-strength steel. On the other hand, in the case where the cooling stop temperature is lower than 300° C., the formation of low-temperature-transformation products such as martensite, which has a large number of mobile dislocations, is significant. As a result, since dislocation recovery is promoted by performing long-term aging in the mid-temperature range, there is a significant decrease in strength. Therefore, the cooling stop temperature in accelerated cooling is set to be 300° C. to 550° C.

<Method for Manufacturing Steel Pipe>

The method for manufacturing the steel pipe according to embodiments of the present invention includes a cold forming process and a welding process.

Cold Forming Process

The cold forming process is a process in which a steel plate which is composed of the high-strength steel according to embodiments of the present invention is subjected to cold forming into a pipe shape.

In the case where a steel pipe for steam transportation is manufactured, it is preferable that the thickness of the above-described steel plate be 12 mm to 30 mm.

There is no particular limitation on the cold forming method used for forming a steel plate into a pipe shape. Examples of a method for forming a steel pipe include a UOE forming method, a press bend forming method, and a roll forming method.

Welding Process

The welding process is a process in which the butt portions of the steel plate, which has been formed into a pipe shape in the cold forming process, are welded. Although there is no particular limitation on the method used for welding, welding connection may be performed by using, for example, a submerged arc welding method. Here, it is preferable that expansion be performed on the steel pipe after welding has been performed in order to increase the roundness of the cross-section of the steel pipe. A heat treatment after a steel pipe has been manufactured may be performed in accordance with desired properties, and there is no particular limitation.

EXAMPLES

After having performed cold forming on steel plates (having a thickness of 15 mm to 25 mm) which had been manufactured under the conditions given in Table 2 from steels A through M having the chemical compositions given in Table 1, steel pipes having an outer diameter of 610 mm and a pipe wall thicknesses of 15 mm to 25 mm were manufactured by performing seam welding. Here, in the manufacturing conditions in Table 2, the term "Rolling Reduction Ratio" means accumulated rolling reduction ratio in a temperature range of 900° C. or lower, the abbreviated term "FT" means rolling finish temperature, the abbreviated term "CR" means cooling rate, the abbreviated term "CS" means cooling stop temperature, and the term "Heat Treatment" means long-term aging treatment.

By taking a sample for steel microstructure observation from the central portion in the width direction of the steel plate which had been manufactured as described above, and by performing mirror polishing on a cross-section in the thickness direction parallel to the rolling longitudinal direction followed by performing nital etching on the cross-section, a microstructure was exposed. Subsequently, after having obtained steel microstructure photographs in five fields of view selected at random through the use of an optical microscope at a magnification of 400 times, bainite phase fraction was determined in the photographs through the use of an image interpretation device.

Regarding the properties of the steel plate, after having taken a tensile test piece in a direction at a right angle to the rolling direction of the steel plate, yield strength (units: MPa) at a temperature of 350° C. was determined. In the tensile test, a round-bar-form test piece having a diameter of 6 mm was used, and a case where the yield strength (units: MPa) at a temperature of 350° C. was 550 MPa or more was judged as good.

Regarding the properties after long-term aging (a heat treatment at a temperature of 400° C. for 8 hours) had been performed, by taking tensile test pieces in directions parallel to and at a right angle to the rolling direction of the steel plate, yield strength (units: MPa) at a temperature of 350° C. was determined. In the tensile test, a round-bar-form test piece having a diameter of 6 mm was used, and a case where the yield strength (units: MPa) at a temperature of 350° C. was 550 MPa or more was judged as good.

Also in the case of the steel pipe, regarding the properties after long-term aging (a heat treatment at a temperature of 400° C. for 8 hours) had been performed, by taking round-bar-form test pieces having a diameter of 6 mm in the circumferential direction of the steel pipe, yield strength was determined as in the case of the steel plate. A case where the yield strength (units: MPa) at a temperature of 350° C. was 550 MPa or more was judged as good.

Dislocation density after long-term aging (a heat treatment at a temperature of 400° C. for 8 hours) had been performed was determined by taking a test piece of 20 mm square having a thickness of 1 mm from the central portion in the thickness direction of the steel plate followed by determining half-value width through the use of X-ray diffractometry and converting the determined value into dislocation density. The analysis method of X-ray diffractometry was the θ-2θ method, and a case where the dislocation density was $1.0 \times 10^{15}/m^2$ or more was judged as good. Here, in the table, the term "E+number" means "10 raised to the power of the number". For example, the term "E+15" means $10^{15}$.

The steel-plate-manufacturing conditions and the derived properties are given in Table 2. In the case of the example steels of embodiments of the present invention (Nos. 1 through 9), whose chemical compositions and steel-plate-manufacturing conditions were within the range according to embodiments of the present invention, the steel plates and the steel pipes had a yield strength (units: MPa) at a temperature of 350° C. of 550 MPa or more, and the steel plates had a yield strength at a temperature of 350° C. after long-term aging had been performed of 550 MPa or more. Here, although the results are not given in the table, in the case of the examples of the present invention, the steel pipes also had a dislocation density after long-term aging (a heat treatment at a temperature of 400° C. for 8 hours) had been performed of $1.0 \times 10^{15}/m^2$ or more, which means good results.

On the other hand, the comparative steels (Nos. 10 through 19), whose chemical compositions or steel-plate-manufacturing conditions were out of the range according to embodiments of the present invention, were inferior to the example steels of the present invention in terms of strength at a temperature of 350° C. and/or strength at a temperature of 350° C. before and after long-term aging.

TABLE 1

(mass %)

| Steel Code | C | Si | Mn | P | S | Cr | Mo | Nb | Ti | Al | N | V | Cu | Ni | X | Note |
|---|---|---|---|---|---|---|---|---|---|---|---|---|---|---|---|---|
| A | 0.06 | 0.11 | 1.84 | 0.006 | 0.001 |  | 0.25 | 0.043 | 0.015 | 0.024 | 0.0045 |  |  |  | 0.76 | Example Steel |
| B | 0.06 | 0.15 | 1.82 | 0.009 | 0.001 | 0.20 | 0.20 | 0.045 | 0.015 | 0.031 | 0.0051 |  |  |  | 0.81 | Example Steel |
| C | 0.07 | 0.15 | 1.85 | 0.008 | 0.001 |  | 0.24 | 0.034 | 0.012 | 0.026 | 0.0042 | 0.028 |  |  | 0.87 | Example Steel |
| D | 0.09 | 0.08 | 1.56 | 0.006 | 0.001 | 0.28 | 0.045 | 0.045 | 0.013 | 0.012 | 0.0043 |  |  | 0.35 | 0.79 | Example Steel |
| E | 0.06 | 0.18 | 1.85 | 0.010 | 0.002 |  | 0.24 | 0.043 | 0.011 | 0.026 | 0.0048 |  | 0.25 | 0.13 | 0.75 | Example Steel |
| F | 0.07 | 0.15 | 1.88 | 0.008 | 0.001 | 0.05 | 0.21 | 0.048 | 0.012 | 0.022 | 0.0055 |  | 0.25 | 0.15 | 0.81 | Example Steel |
| G | 0.05 | 0.14 | 1.73 | 0.008 | 0.001 |  | 0.26 | 0.016 | 0.008 | 0.025 | 0.0038 | 0.042 |  | 0.24 | 0.77 | Example Steel |
| H | 0.07 | 0.10 | 1.90 | 0.009 | 0.001 | 0.05 | 0.32 | 0.015 | 0.010 | 0.021 | 0.0038 | 0.050 | 0.20 | 0.20 | 0.89 | Example Steel |
| I | 0.08 | 0.06 | 1.72 | 0.011 | 0.002 |  | 0.13 | 0.048 | 0.009 | 0.015 | 0.0036 |  |  |  | 0.72 | Comparative Steel |
| J | 0.03 | 0.12 | 1.85 | 0.011 | 0.002 |  | 0.18 | 0.041 | 0.015 | 0.018 | 0.0046 |  |  |  | 0.67 | Comparative Steel |
| K | 0.12 | 0.19 | 1.60 | 0.008 | 0.001 | 0.25 | 0.08 | 0.036 | 0.012 | 0.026 | 0.0042 |  |  |  | 0.61 | Comparative Steel |
| L | 0.06 | 0.11 | 1.42 | 0.012 | 0.001 | 0.15 | 0.20 | 0.030 | 0.018 | 0.032 | 0.0055 |  |  |  | 0.61 | Comparative Steel |
| M | 0.06 | 0.15 | 1.85 | 0.008 | 0.001 | 0.10 | 0.20 | 0.005 | 0.011 | 0.028 | 0.0043 | 0.020 |  |  | 0.44 | Comparative Steel |

Annotation: An underlined portion written in bold indicates a value out of the range according to the present invention.
Annotation: X = 0.35Cr + 0.9Mo + 12.5Nb + 8V
The symbols of elements respectively denote the contents (mass %) of the corresponding alloy chemical elements.

TABLE 2

| | | | Steel-Plate-Manufacturing Condition | | | | | Steel Plate | Yield Strength at 350° C. [Steel Plate] | | Yield Strength at 350° C. [Steel Pipe] | | after Heat Treatment | |
|---|---|---|---|---|---|---|---|---|---|---|---|---|---|---|
| No. | Steel | Thickness (mm) | Heating Temperature (° C.) | Rolling Reduction Ratio (%) | FT (° C.) | CR (° C./s) | CS (° C.) | Bainite Phase Fraction (%) | before Heat Treatment (MPa) | after Heat Treatment (MPa) | before Heat Treatment (MPa) | after Heat Treatment (MPa) | Dislocation Density (1/m²) | Note |
| 1 | A | 15 | 1150 | 75 | 850 | 25 | 480 | 95 | 584 | 576 | 589 | 596 | 1.18E+15 | Example Steel |
| 2 | B | 20 | 1100 | 75 | 820 | 25 | 500 | 90 | 595 | 581 | 627 | 609 | 1.35E+15 | Example Steel |

TABLE 2-continued

| | | | Steel-Plate-Manufacturing Condition | | | | | Steel Plate | Yield Strength at 350° C. [Steel Plate] | | Yield Strength at 350° C. [Steel Pipe] | | after Heat Treatment | |
|---|---|---|---|---|---|---|---|---|---|---|---|---|---|---|
| | | | | | | | | | before | after | before | after | | |
| No. | Steel | Thickness (mm) | Heating Temperature (° C.) | Rolling Reduction Ratio (%) | FT (° C.) | CR (° C./s) | CS (° C.) | Bainite Phase Fraction (%) | Heat Treatment (MPa) | Heat Treatment (MPa) | Heat Treatment (MPa) | Heat Treatment (MPa) | Dislocation Density (1/m$^2$) | Note |
| 3 | C | 20 | 1100 | 75 | 760 | 25 | 520 | 80 | 621 | 595 | 668 | 662 | 1.89E+15 | Example Steel |
| 4 | D | 25 | 1100 | 80 | 840 | 25 | 520 | 85 | 598 | 570 | 601 | 587 | 1.07E+15 | Example Steel |
| 5 | E | 20 | 1120 | 70 | 800 | 20 | 460 | 95 | 607 | 593 | 623 | 604 | 1.38E+15 | Example Steel |
| 6 | F | 20 | 1200 | 75 | 800 | 25 | 520 | 85 | 591 | 570 | 590 | 582 | 1.24E+15 | Example Steel |
| 7 | F | 20 | 1200 | 75 | 800 | 20 | 380 | 90 | 558 | 582 | 631 | 618 | 1.37E+15 | Example Steel |
| 8 | G | 25 | 1140 | 75 | 800 | 20 | 400 | 100 | 573 | 604 | 664 | 676 | 2.12E+15 | Example Steel |
| 9 | H | 20 | 1200 | 75 | 800 | 30 | 400 | 100 | 585 | 647 | 679 | 682 | 2.56E+15 | Example Steel |
| 10 | F | 25 | 940 | 75 | 800 | 20 | 500 | 85 | 513 | 533 | 515 | 530 | 6.20E+14 | Comparative Steel |
| 11 | F | 25 | 1200 | 40 | 800 | 20 | 480 | 90 | 526 | 542 | 524 | 538 | 8.60E+14 | Comparative Steel |
| 12 | F | 25 | 1200 | 75 | 880 | 20 | 500 | 80 | 532 | 544 | 536 | 547 | 8.75E+14 | Comparative Steel |
| 13 | F | 25 | 1200 | 75 | 800 | 2 | 600 | 30 | 511 | 542 | 508 | 551 | 1.03E+15 | Comparative Steel |
| 14 | F | 25 | 1200 | 75 | 800 | 45 | 210 | 45 | 529 | 554 | 583 | 532 | 9.60E+14 | Comparative Steel |
| 15 | I | 15 | 1140 | 75 | 820 | 30 | 480 | 95 | 593 | 536 | 588 | 542 | 7.50E+14 | Comparative Steel |
| 16 | J | 25 | 1100 | 75 | 840 | 20 | 500 | 90 | 498 | 468 | 526 | 489 | 3.80E+14 | Comparative Steel |
| 17 | K | 25 | 1120 | 70 | 800 | 15 | 520 | 80 | 612 | 535 | 610 | 545 | 8.10E+14 | Comparative Steel |
| 18 | L | 25 | 1120 | 75 | 840 | 20 | 500 | 80 | 487 | 538 | 521 | 542 | 9.32E+14 | Comparative Steel |
| 19 | M | 20 | 1100 | 70 | 780 | 25 | 450 | 85 | 518 | 525 | 524 | 501 | 2.30E+14 | Comparative Steel |

Annotation: An underlined portion written in bold indicates a value out of the range according to the present invention.

The invention claimed is:

1. High-strength steel having
a chemical composition containing, by mass %, C: 0.04% to 0.09%, Si: 0.05% to 0.20%, Mn: 1.5% to 2.0%, P: 0.020% or less, S: 0.002% or less, Cr: 0.50% or less, Mo: 0.10% to 0.50%, Nb: 0.010% to 0.050%, V: 0.070% or less, Ti: 0.005% to 0.02%, Al: 0.01% to 0.04%, N: 0.006% or less, and the balance being Fe and inevitable impurities, wherein X (%), as calculated by equation (1):

$$X(\%) = 0.35Cr + 0.9Mo + 12.5Nb + 8V \quad (1),$$

is 0.75% or more, wherein the symbols of chemical elements in equation (1) respectively denote the contents (mass %) of the corresponding chemical elements, and the symbol of a chemical element which is not included is assigned a value of 0 a microstructure having a bainite phase fraction of 50% or more, a dislocation density of $1.0 \times 10^{15}$ /m$^2$ or more after aging has been performed under the condition of a Larson-Miller parameter (LMP) of 15000, and a yield strength of 550 MPa or more before and after the aging is performed.

2. The high-strength steel according to claim 1, wherein the chemical composition of the high-strength steel further contains, by mass %, one or both of Cu: 0.50% or less and Ni: 0.50% or less.

3. A steel pipe composed of the high-strength steel according to claim 1.

4. A method for manufacturing the high-strength steel according to claim 1, the method comprising:
a heating process wherein a steel raw material is heated to a temperature of 1100° C. to 1200° C.;
a hot rolling process wherein the steel raw material, which has been heated in the heating process, is hot-rolled under the conditions of an accumulated rolling reduction ratio in a temperature range of 900° C. or lower of 50% or more and a rolling finish temperature of 850° C. or lower; and an accelerated cooling process wherein the hot-rolled steel plate, which has been obtained in the hot rolling process, is subjected to accelerated cooling under the conditions of a cooling rate of 5° C/s or more and a cooling stop temperature of 300° C. to 550° C.

5. A method for manufacturing a steel pipe, the method comprising:

a cold forming process wherein a steel plate composed of the high-strength steel according to claim 1 is subjected to cold forming so as to be formed into a pipe shape; and a welding process wherein the butt portions of the steel plate, which has been formed into a pipe shape in the cold forming process, are welded.

6. A steel pipe composed of the high-strength steel according to claim 2.

7. A method for manufacturing the high-strength steel according to claim 2, the method comprising:

a heating process wherein a steel raw material is heated to a temperature of 1100° C. to 1200° C.;

a hot rolling process wherein the steel raw material, which has been heated in the heating process, is hot-rolled under the conditions of an accumulated rolling reduction ratio in a temperature range of 900° C. or lower of 50% or more and a rolling finish temperature of 850° C. or lower; and an accelerated cooling process wherein the hot-rolled steel plate, which has been obtained in the hot rolling process, is subjected to accelerated cooling under the conditions of a cooling rate of 5° C/s or more and a cooling stop temperature of 300° C. to 550° C.

8. A method for manufacturing a steel pipe, the method comprising:

a cold forming process wherein a steel plate composed of the high-strength steel according to claim 2 is subjected to cold forming so as to be formed into a pipe shape; and a welding process wherein the butt portions of the steel plate, which has been formed into a pipe shape in the cold forming process, are welded.

9. The high-strength steel according to claim 1, wherein the total amount of the Cu content, the Ni content, the Cr content, and the Mo content (Cu+Ni+Cr+Mo) is 0.90% or less.

* * * * *